Sept. 8, 1925.
A. H. EDWARDS
FLOOR SCRAPER
Filed April 28, 1924
1,553,151
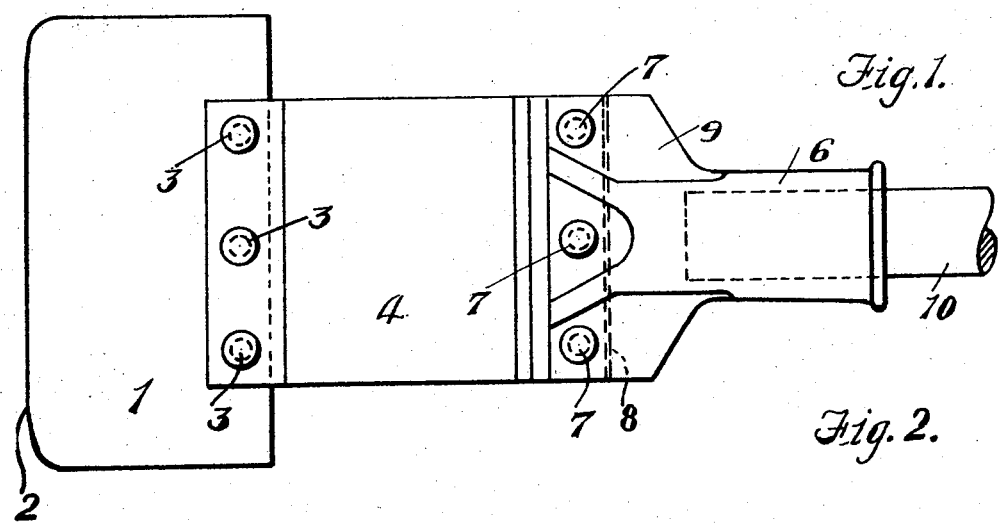
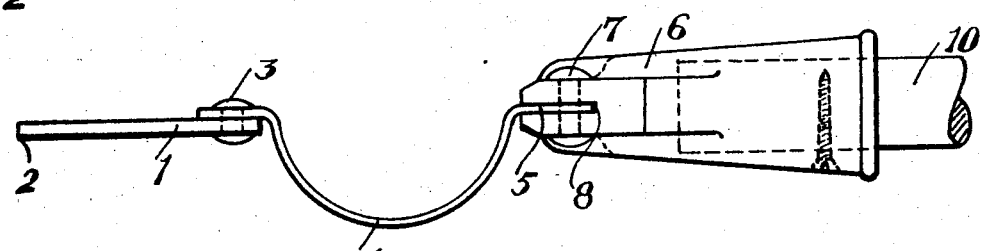
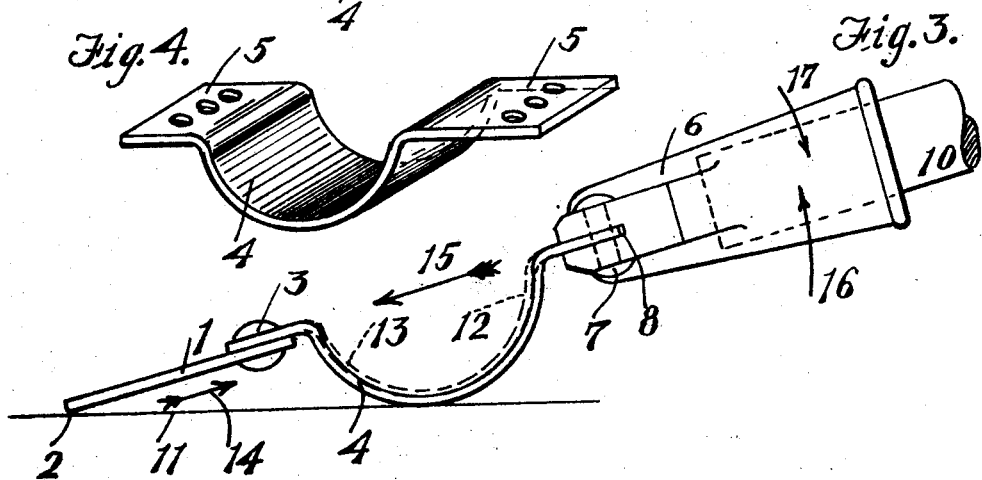
INVENTOR.
Adna H. Edwards.
BY Harry W. Bowen.
ATTORNEY.

Patented Sept. 8, 1925.

1,553,151

UNITED STATES PATENT OFFICE.

ADNA H. EDWARDS, OF WESTFIELD, MASSACHUSETTS.

FLOOR SCRAPER.

Application filed April 28, 1924. Serial No. 709,528.

*To all whom it may concern:*

Be it known that I, ADNA H. EDWARDS, a citizen of the United States, residing at Westfield, in the county of Hampden and State of Massachusetts, have invented new and useful Improvements in Floor Scrapers, of which the following is a specification.

This invention relates to improvements in scraper devices and particularly for use in scraping floors for smoothing the same or for removing any hard or dried substances, as dough in bakeries, or dried paints, or for surfacing a floor before it is finally finished and rubbed down. The invention broadly considered, comprises a scraping blade proper which engages the surface to be scraped or cleaned. It is preferably formed with slightly curved corners to prevent its grooving or scratching the floor or other surface. A handle portion is provided having an elastic or yieldable connection between the blade and handle, the elastic section being substantially a semi-cylindrical member for the purpose of forming a cushion effect between the blade and the handle when in use.

Heretofore, it has been a common practice to attach the scraping blade directly to the handle with the result that very unsatisfactory results have been obtained, since there is practically no yielding effect between the handle and the bearing and scraping edge part of the blade.

Referring to the drawings:

Fig. 1 is a plan view of the completed article showing the scraper blade, the elastic section and the handle section.

Fig. 2 is a side elevational view of Fig. 1 illustrating the semi-circular shaped elastic section or member.

Fig. 3 is a view illustrating the device when in operation showing the positions which the elastic section assumes when in use, and Fig. 4 is a detail perspective view of the elastic section.

Referring to the drawings in detail:

1 designates the scraping blade proper which is preferably formed of sheet metal or steel of suitable thickness and of a temper slightly softer than the ordinary file, whereby the scraping edge or corner 2 may be sharpened, as desired. Attached to the blade 1 by means of the rivets 3 is a semi-cylindrical member 4 which is composed of a flat piece of suitable elastic or springy material. The opposite ends of this member are bent to form the edge portion 5 for providing suitable means for attaching the same to the socket handle 6 and blade 1. Rivets 7 are employed for attaching the member 4 to the handle socket 6. The socket handle receiving member 6 is formed with an opening 8 in which one of the edge portions 5 is inserted and riveted. The opening 8 is located in the broadened portion 9 which is a part of the handle socket 6. It is preferably formed integrally with the handle socket member. It is flattened out equal in width, to the semi-cylindrical member 4 as shown in Fig. 1. 10 designates a handle or rod member which is inserted in the socket member 6. In use the edge 2 of the blade 1 is moved along the surface 11 which is to be scraped or cleaned. When pressure is applied to the handle 10 the elastic member 4 will assume substantially the dotted line positions 12 and 13. The dotted line 12 representing a position of the flexible member 4 which is caused by the axial pressure on the handle 10 and the dotted line 13 being the opposite pressure on the blade 1. This opposite pressure being indicated by the arrow 14. The other line of pressure being indicated by the arrow 15. It is of course understood that there is a certain yielding effect transversely to the line 15 as indicated by the arrows 16 and 17 whereby the position of the scraping edge 2 may be varied to produce just the right finishing effect. By employing the yielding connecting member 4 the edge 2 is prevented from injuring the surface on which it is applied since more or less of the stored energy in the semi-cylindrical spring member 4 would be released to assist in removing any obstruction or roughness on the surface 11. This is particularly necessary in removing dried or hardened dough or paint substances.

It should also be stated that the elastic member 4 is placed with its curved surface downward, as it has been found in practice that it is more effective in preventing the edge 2 from injuring the surface 11. There is always a yielding effect in a forward and backward direction when in use.

It is of course understood that I do not limit myself to the exact structure shown in the drawings as other equivalent structures may be employed as desired, the main object being the insertion of an elastic section between the handle and the blade to obtain the results referred to.

What I claim is:

1. A device of the character described, comprising a scraping element, a handle member, an elastic member connecting the handle member and said element, said elastic element comprising a flat piece of spring material which is bent out of the plane of the blade and the axis of the handle member, as described.

2. In a scraping device, the combination, a scraping blade, a spring member attached thereto, a handle member attached to the spring member, said spring member being substantially semi-cylindrical in form and arranged with the concavo-convex portion below the plane of the blade.

3. A scraping device comprising in combination, a scraping blade, a handle, a socket member in which the handle is placed, means for connecting the blade and socket member comprising a semi-circular cylindrical element composed of elastic material.

4. A scraping device comprising in combination, a scraping blade, a handle, a socket member in which the handle is placed, means for connecting the blade and socket member comprising a semi-circular cylindrical element composed of elastic material, the elastic member being bent below the plane of the blade, and formed with wing portions for attaching the said element to the blade and socket member.

ADNA H. EDWARDS.